US005880919A

United States Patent [19]

[11] Patent Number: 5,880,919

[45] Date of Patent: Mar. 9, 1999

Napiorkowski et al.

[54] GAS TUBE SURGE PROTECTOR WITH INTERACTING VARISTORS

[75] Inventors: John J. Napiorkowski, Irving; Boyd G. Brower, Keller, both of Tex.

[73] Assignee: Siecor Corporation, Hickory, N.C.

[21] Appl. No.: 881,422

[22] Filed: Jun. 24, 1997

[51] Int. Cl.[6] .......... H02H 1/00

[52] U.S. Cl. .......... 361/117; 361/56; 361/120; 361/127

[58] Field of Search .......... 361/117, 56, 58, 361/91, 118, 119, 120, 124, 103, 127

[56] References Cited

U.S. PATENT DOCUMENTS

| | | | |
|---|---|---|---|
| 4,023,071 | 5/1977 | Fussell | 361/56 |
| 4,584,622 | 4/1986 | Crosby et al. | 361/56 |
| 4,628,394 | 12/1986 | Crosby et al. | 361/56 |
| 4,876,713 | 10/1989 | Crosby et al. | 379/412 |
| 4,903,295 | 2/1990 | Shannon et al. | 379/437 |
| 4,944,003 | 7/1990 | Meyerhoefer et al. | 379/412 |
| 5,008,772 | 4/1991 | Neawirth et al. | 361/119 |
| 5,383,085 | 1/1995 | Boy et al. | 361/119 |
| 5,388,023 | 2/1995 | Boy et al. | 361/129 |
| 5,410,596 | 4/1995 | Shannon et al. | 379/412 |
| 5,500,782 | 3/1996 | Oertel et al. | 361/120 |

*Primary Examiner*—Jeffrey Gaffin
*Assistant Examiner*—Stephen Jackson

[57] ABSTRACT

A surge protector is provided that has a gas tube and at least one MOV that is coordinated with the gas tube such that the MOV interacts with the gas tube to lower the impulse breakdown voltage of a gas tube of a type that has a wide range of DC breakdown voltages across a population of the gas tubes. The gas tube is a generally cylindrical three element gas tube and the MOVs are disposed at opposite ends of the gas with fusible elements maintained in position by a clip. A population of the gas tubes has a range of breakdown voltages and the clamping voltage of the MOVs is set within this range such that the MOV will interact with any gas tube with a breakdown voltage in the population range to divert a surge to ground.

18 Claims, 2 Drawing Sheets

GAS TUBE SURGE PROTECTOR WITH INTERACTING VARISTORS

TECHNICAL FIELD OF THE INVENTION

The present invention relates to surge protectors for use in telecommunications lines. In one aspect the present invention relates to a protector with metal oxide varistors (MOVs) that interact with a gas tube to divert surges to ground.

BACKGROUND OF THE INVENTION

Gas tube arresters are commonly used to protect telecommunication lines from electrical surges. Since gas tube arresters need to be hermetically sealed to perform the protection function, there is the possibility that the gas will vent from the arrester resulting in a much higher breakdown voltage than originally intended and rendering the gas tube unable to protect. To provide for continued protection should venting occur, arresters are provided with back up protection in the form of an air gap or with a solid state device, for example, a metal oxide varistor (MOV).

U.S. Pat. No. 5,388,023 discloses a gas tube protector with one or two MOVs used as a back up. A gas tube protector with a back up device is sometimes referred to as "vent safe." In such protectors, the gas tube is sometimes termed the "primary protector." Gas tubes are widely used as primary protectors because of their ability to repeatedly divert large surge currents to ground and remain functional to protect.

Because it is desired that the gas tube and not the back up divert surges to ground, the operate voltage of the MOVs are set higher than the operate voltage of the gas tube. The '023 patent discloses "5 to 10% or else between 10 and 40% above the response voltage of the overvoltage arrestor." With the response voltage of the MOVs set in such a range, the MOVs are intended to only divert surges if the gas tube has vented. In normal operation, the gas tube alone is intended to divert surges to ground. The '023 patent defines the response voltage of the MOV as the voltage at which the varistor conducts a current of 1 mA.

U.S. Pat. No. 5,500,782 also discloses the use of a MOV with a gas tube with the clamping voltage of the MOV above the breakdown voltage of the gas tube. While the '782 patent uses the term "hybrid" to describe the disclosed protector arrangement, the MOVs are used as a back up protection device in the event that the gas tube should vent. The '782 patent teaches that the 1 mA clamping voltage of the MOV is selected to be just above the upper tolerance of the DC breakdown voltage of the gas tube so that the gas tube acts as the primary surge protector and the MOV provides back up protection in case the gas discharge tube fails to operate properly.

MOVs are preferred over traditional air gaps because they have a more repeatable clamping voltage than air gaps in response to fast rising voltage transients and they are not susceptible to contamination and moisture like the air gap.

One drawback of gas tubes as protectors is their ionization time which contributes to a higher peak surge voltage, or impulse breakdown voltage. The DC breakdown voltage of a gas tube is the voltage at which a gas tube will ionize when the voltage is increased slowly, for example, 100 volts per second. By raising the voltage slow enough such that the ionization time of the gas tube is taken into account, the DC breakdown voltage of the gas tube can be determined. If the voltage is a surge voltage, for example, 100 volts per microsecond, the gas tube will breakdown at a voltage predominantly higher than its DC breakdown voltage because of the ionization time of the gas tube. This higher voltage is termed "surge breakdown voltage" or "impulse breakdown voltage." It is possible that the impulse breakdown voltages of the gas tubes are sufficiently high that there could still be a shock to a person that is in contact with the circuit at the time of the surge Therefore, it is possible to have personnel injury and/or equipment damage from a gas tube protected circuit.

Therefore a need exists for a telecommunications protector with a robust gas tube protector as the primary protector but that is "assisted" by a secondary protector against fast surges to lower the impulse voltage. A further need exists for a protector where the secondary protector is capable of acting as a back up should the gas tube vent.

Another drawback of gas tubes is that there are wide variances of the DC breakdown voltages among gas tubes of the same type and made by the same manufacturing process. This variance is much wider than the variances for other components such as MOVs and fusible elements. Thus a need exists for a gas tube protector with a secondary protector that lowers the impulse voltage that takes into account the wide range of DC breakdown voltages across a population of gas tubes of the same type.

While both the '023 and '782 patents disclose incorporation of "fail safe" arrangements in the protector to short to ground any surges that overheat the protector, one drawback of the '782 patent arrangement is its bulkiness. The MOVs are spaced from the gas tube and arranged in a manner that takes up more space than the arrangement in the '023 patent which compactly locates two MOVs on opposite ends of the gas tube while still incorporating a thermal overload short to ground arrangement. Either one of the MOVs alone or the gas tube alone if overheated will melt the thermal element in the '023 arrangement to short to ground. Also, the MOVs in the '782 patent are not of sufficient size to impact the surge voltage under normal operating conditions.

SUMMARY OF THE INVENTION

The present invention provides a telecommunications equipment surge protector that has a gas tube protector as the primary protector with MOVs that interact with the gas tube to divert surges to ground. In one aspect, a surge protector for protecting people and telecommunications equipment from overvoltage surges is provided that comprises a gas tube of a particular type that has a DC breakdown voltage that varies from a particular gas tube to a particular gas tube of the type due to manufacturing and component variances. The gas tube has a DC breakdown voltage within a range of DC breakdown voltages between a maximum DC breakdown voltage and a minimum DC breakdown voltage set for a population of the type of gas tubes. The protector further comprises at least one MOV arranged in parallel with the gas tube. The clamping voltage of the MOV at 1 mA being set between the maximum DC breakdown voltage and the minimum DC breakdown voltage such that the MOV will lower the impulse breakdown voltage of the gas tube yet not burn out in response to surge voltages whether the gas tube has the maximum DC breakdown voltage or the minimum DC breakdown voltage.

In another aspect of the present invention, a surge protector for protecting telecommunications equipment and people is provided that comprises a gas tube that has a DC breakdown voltage and that is generally cylindrical with line electrodes at opposite ends of the cylinder. An MOV is located outside of each end of the gas tube and arranged electrically in parallel with the line electrodes. A clip bears axially inward to maintain the MOVs in position at the ends of the gas tube. The clamping voltage of the MOV at 1 mA is coordinated with the breakdown voltage of the gas tube such that the MOV will lower the impulse breakdown voltage of the gas tube in response to a surge voltage.

DETAILED DESCRIPTION OF THE PREFERRED EMBODIMENT

Figure 1:
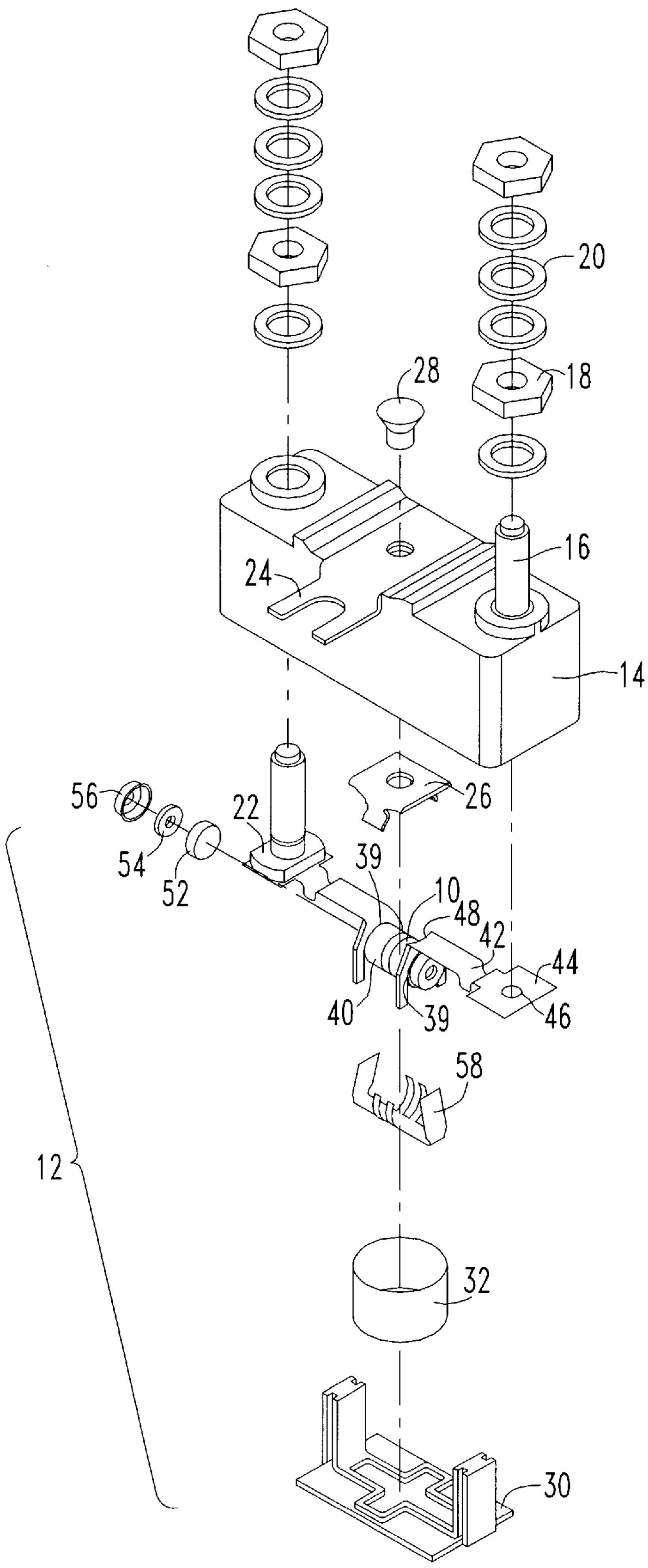
FIG. 1 is an exploded perspective view of a protector module application that incorporates the preferred embodiment of the protector assembly of the present invention.

With reference to FIG. 1, one application for use of protector assembly 10 of the present invention is shown as protector module 12. Module 12 is commonly referred to as a station protection module and is used in network interface devices (NIDs) on the side of a telephone subscribers residence to protect the telephone lines and equipment at the subscriber from being damaged by surges caused, for example, by lightening or power crosses. It should be understood that protector assembly 10 can be adapted for use in other telecommunications applications and packaging, for example, being incorporated in a PTD® module as disclosed in U.S. Pat. No. 5,333,193 and others.

The footprint and exterior features of module 12 apart are known in the art and generally has housing 14 through which extend studs 16 which have nuts 18 and washers 20 which is known in the art for attaching telephone lines. Insulation displacement terminals could be used instead of the stud and nut terminals.

Studs 16 have heads 22 which are electrically connected to leads 42 which in turn are electrically connected to the line electrodes 39 of gas tube element 40 of protector assembly 10. Assembly 10 is also in contact with ground bracket 24 through mount 26 and rivet 28, and assembly 10 is intended to conduct any surges to ground bracket 24 which is to be connected to earth ground on installation of the NID. Module 12 is closed by cover 30. Flexible band 32 can be placed around assembly 10 for added support against shocks from handling, shipping and during installation. Leads 42 are identical in the preferred embodiment and have first end 44 which has hole 46 for facilitating riveting/soldering of one of the studs 16 used in this application thereto. Leads 42 have second end 48 opposite first end 44 that is attached to protector element 40. The structure of leads 42 and their engagement with element 40 is fully disclosed in U.S. Ser. No. 881,486 entitled "Surge Protector and Lead Assembly with Improved Contact Surface Area Between the Protector and Lead" filed concurrently herewith and assigned to the assignee of the present application and same is incorporated herein by reference. Leads 42 are not part of the present invention.

The arrangement of the components of assembly 10 is generally disclosed in U.S. Pat. No. 5,388,023 and available commercially from Siemens. The '023 patent is incorporated herein in its entirety. The arrangement of assembly 10 of the present invention is generally the same as the right side of FIG. 1 of the '023 patent applied to both sides of the protector. That is, the present invention uses an MOV on both sides of the gas tube instead of a spacer on one side and an MOV on the other as shown in FIG. 1 of the '023 patent. With reference to FIG. 1 of the present application, there is gas tube element 40, two metal oxide varistors (MOVs) 52, fusible elements 54 and end caps 56 all maintained in place by clip 58. The differences between the preferred arrangement of FIG. 1 and the right side of FIG. 1 of the '023 patent applied to both sides of a gas tube are the following (reference numerals that follow are those of the '023 patent): 1) there is no rubber ring 24 as shown in the '023 patent because end cap 15 is made slightly conical to prevent contact as is disclosed as an alternative in the '023 patent; 2) the ends of arms 13 of clip 10 do not have a hole coinciding with the hole in end caps 15; 3) the centrally arrange clamp 11 of clip 10 is instead forked to contact the sides of center electrode 1; 4) connecting wires 6 and 7 are eliminated and replaced with the leads shown in FIG. 1 herein and that are the subject of the above referenced co-pending application, and 5) a flexible band is placed around the preferred arrangement to help the assembly withstand impacts from being dropped, etc. Other than these primary differences, reference is made to the '023 patent for further explanation of these components. As an alternative arrangement, fusible element 54 can be placed between the gas tube and the MOV as shown in FIG. 3 of the '023 patent.

The present invention incorporates the thermal overload short to ground features of the '023 patent. Specifically, when fusible element 54 reaches the temperature at which it melts, an end cap 56 is biased axially inward by clip 58 and contacts an end electrode of the gas tube element 40. The signal then travels through clip 58 to the center ground electrode to divert the surge to ground. In the preferred embodiment, a fusible element is chosen that melts at around 203 degrees Fahrenheit.

While the present invention incorporates the general component arrangement of the '023 patent, the present invention coordinates the surge protection qualities of the gas tube and the MOVs in a different manner to achieve a coordinated protector where the MOVs interact with gas tubes with a range of DC breakdown voltages to divert surges to ground instead of merely acting as a substitute air gap as disclosed in the '023 patent. With the gas tube and MOV elements interacting, better surge response is achieved.

Gas tube element 40 by its nature is difficult to repeatedly manufacture with a precise DC breakdown voltage. As a result, for a population of gas tube elements 40, the DC breakdown voltage varies across a range that is wider than ranges for the other components which are more amenable to consistent manufacture. Accordingly, for a particular gas tube type and manufacturing type, an acceptable range of DC breakdown voltage for gas tubes of that type is determined and a minimum and a maximum DC breakdown voltage are selected to define the range. Part of the manufacturing process for the gas tube type is to test each gas tube and only pass those gas tubes that fall between the selected minimum and maximum breakdown voltages for that particular gas tube type and thereby create a population of gas tubes of the same type that fall within the minimum and maximum DC breakdown voltages. If the range is too small, then too large of a percentage of gas tubes that are manufactured are not being used and thus wasted. If the range is too large, then the ability to properly coordinate the MOVs with any gas tube in the range becomes more difficult.

As discussed above, the DC breakdown voltage is the voltage at which a gas tube breaks down and diverts electricity to ground when the rate of rise of the voltage is sufficiently low such that the ionization time of the gas tube is not exceeded. When the rate of rise of voltage rises to surge levels, the gas tube breakdowns at an impulse voltage breakdown voltage that is higher than the DC breakdown voltage because the ionization time of the gas tube allowed the voltage to rise above the DC breakdown voltage level before the gas tube could divert the surge. The impulse breakdown voltage of the gas tube varies as a function of the rate of rise of the voltage. The time it takes for a gas tube to operate is commonly termed its "operate time."

The MOVs on the other hand clamp voltages and prevent them from getting too high. In a protector with MOVs only, if the surge is too high for the MOV to clamp the MOV may bum out and the thermal overload short to ground feature would operate to prevent damage to people and equipment. MOVs are immediate and are not rate of rise dependent like the gas tube. Instead, an MOV's clamping voltage is a function of current. As current increases, the clamping voltage of the MOV increases.

When an MOV is combined with a gas tube so that the MOV acts as a replacement for an air gap back up, the MOV's clamping voltage is sufficiently higher than the gas tubes DC breakdown voltage so that the impulse breakdown voltage of the gas tube is not appreciably affected. However, the present invention lowers the clamping voltage of the MOV relative to the DC breakdown voltage of the gas tube so that the MOV will clamp surges during the ionization time of the gas tube thereby lowering the impulse voltage of the gas tube.

However, even gas tubes made on the same manufacturing line have a wide range of DC breakdown voltages. The present invention takes into account the range of DC breakdown voltages of gas tubes by setting the MOV clamping voltage at a point to achieve optimal coordination between the MOV and any gas tube in the range of DC breakdown voltages to balance two competing objectives:

1) lower the impulse breakdown voltage below that of a gas tube alone for any gas tube in the population, yet 2) allow the gas tube to protect the MOV from being burned out for any gas tube in the population.

If the MOV is set too high, there may be some gas tubes at the low end of the range where the impulse breakdown voltage will not be lowered and the MOV operates merely as a substitute air gap. If the MOV is set too low, a risk develops that the MOV could be burned out before the gas tube can divert the surge to ground if the MOV is matched with some gas tubes at the high end of the range of gas tubes.

In the preferred embodiment, the difference between the minimum and maximum DC breakdown voltage of gas tube element 40 is about 115 volts to about 155 volts and more preferably about 135 volts. Preferably the minimum DC breakdown voltage is about 265 volts with the maximum DC breakdown voltage being about 400 volts. The operate time of the gas tube is between about 1 to about 20 microseconds.

In the preferred embodiment, the clamping voltage of the MOV at 1 mA is set in the middle 60% of the range of the DC breakdown voltages and more preferably is set at about the 45% point in the range of the DC breakdown voltages. In the preferred range of DC breakdown voltages of 265 to 400, the clamping voltage of the MOV is preferably between about 300 volts and about 330 volts. It has been found that in these preferred ranges, the MOV can be selected to be a clamping voltage that will lower the impulse voltage of a gas tube with a DC breakdown voltage at 265 volts and yet will not burn out when matched with a gas tube with a DC breakdown voltage of 400 volts.

Figure 2:
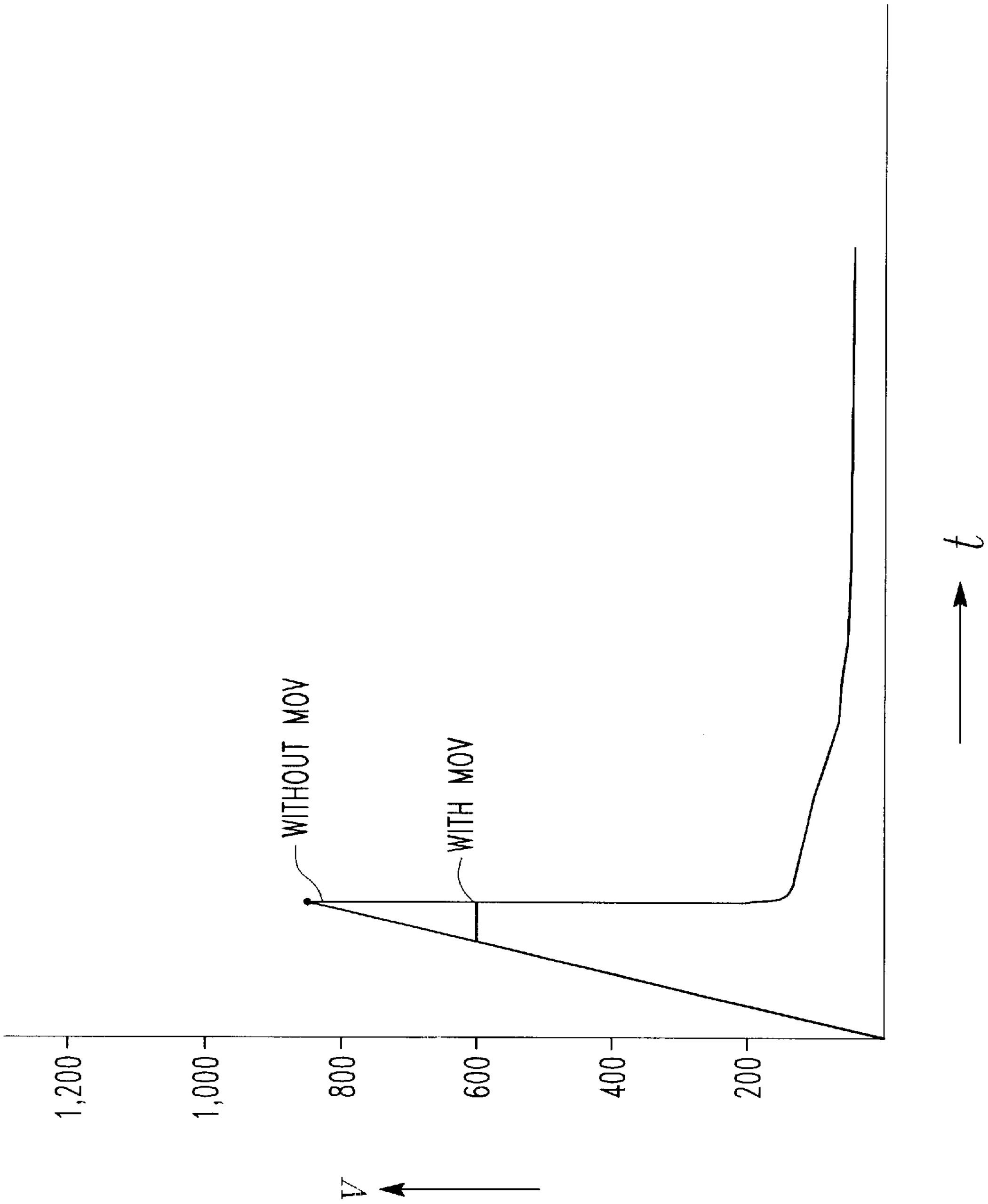
FIG. 2 is a chart illustrating the interaction of the MOVs and gas tube in responding to a surge.

As an example, a Siemens gas tube T44-C350 was used in the arrangement of the right side of FIG. 1 of the '023 patent applied to both ends with two Siemens Z40-230 MOVs. After subjecting the protector to a 10 kV/μs surge, the MOVs and the gas tube had a break down voltages of 743 on the ring side and 729 on the tip side. In comparison, when subjecting the same gas tube without the MOV to the same surge, it was found that the breakdown voltages were 806 for the ring side and 777 for the tip side. FIG. 2 illustrates how the MOV acts to lower the impulse breakdown voltage by clamping the surge until the gas tube has time to respond.

Although the present invention has been described with respect to a preferred embodiment, it should be understood that various changes, substitutions and modifications may be suggested to one skilled in the art and its is intended that the present invention encompass such changes, substitutions and modifications as fall within the scope of the appended claims.

We claim:

1. A surge protector for protecting people and telecommunications equipment from overvoltage surges, comprising:

(a) a gas tube of a particular type of gas tube, the type of gas tube having a DC breakdown voltage that varies from a particular gas tube to a particular gas tube of the type due to manufacturing and component variances, the gas tube having a DC breakdown voltage within a range of DC breakdown voltages between a maximum DC breakdown voltage and a minimum DC breakdown voltage set for a population of the type of gas tubes; and (b) at least one MOV arranged in parallel with the gas tube, the clamping voltage of the MOV at 1 mA being set between the maximum DC breakdown voltage and the minimum DC breakdown voltage such that the MOV will lower the impulse breakdown voltage of the gas tube yet not burn out in response to surge voltages whether the gas tube has the maximum DC breakdown voltage or the minimum DC breakdown voltage.

2. The protector of claim 1 wherein the gas tube is a three element gas tube and wherein there are two MOVs arranged in parallel with the line electrodes of the gas tube.

3. The protector of claim 2 wherein the MOVs are external of the gas tube.

4. The protector of claim 3 wherein the MOVs are in contact with the line electrodes of the gas tube.

5. The protector of claim 4 further comprising a fusible element in contact with the MOV such that overheating of the MOV will melt the fusible element and short the protector to ground.

6. The protector of claim 5 wherein the MOVs are generally disk shaped and located on opposite ends of the gas tube and the fusible elements are located on the outside of the MOVs and the protector further comprises a clip that bears axially inward on the outside of the fusible elements.

7. The protector of claim 1 wherein the difference between the minimum DC breakdown voltage and the maximum DC breakdown voltage is between about 115 volts and about 155 volts.

8. The protector of claim 7 wherein the difference between the minimum DC breakdown voltage and the maximum DC breakdown voltage is about 135 volts.

9. The protector of claim 7 wherein the clamping voltage of the MOV at 1 mA is set in the middle 60% of the range of the DC breakdown voltages.

10. The protector of claim 9 wherein the clamping voltage of the MOV at 1 mA is set at about the 45% point in the range of the DC breakdown voltages.

11. The protector of claim 1 wherein the breakdown voltage of the gas tube is between 265 and 400 volts and the clamping voltage of the MOVs is between about 300 and 330.

12. The protector of claim 1 wherein the operate time of the gas tube is between about 1 microsecond and 20 microseconds.

13. A surge protector for protecting telecommunications equipment, comprising:

(a) a gas tube that has a DC breakdown voltage and that is generally cylindrical with a line electrode at opposite ends of the cylinder;

(b) an MOV located outside of each end of the gas tube and arranged electrically in parallel with the line electrodes;

(c) a clip that bears axially inward to maintain the MOVs in position at the ends of the gas tube;

(d)the clamping voltage of the MOV at 1 mA being coordinated with the breakdown voltage of the gas tube such that the MOV will lower the impulse breakdown voltage of the gas tube in response to a surge voltage.

14. The protector of claim 13 further comprising a fusible element located at each end of the gas tube and maintained in position by the clip, and wherein overheating of one of the MOVs will melt the corresponding fusible element to short the protector to ground.

15. The protector of claim 14 wherein the MOVs and fusible elements are generally disk shaped and the MOVs are in contact with the line electrodes of the gas tube and the fusible elements are located axially outward of the MOVs.

16. The protector of claim 14 wherein the MOVs and fusible elements are generally disk shaped and the fusible elements are located between the line electrodes of the gas tube and the MOVs.

17. The protector of claim 13 wherein the gas tube is of a type that has a wide range of DC breakdown voltages and a minimum DC breakdown voltage and a maximum DC breakdown voltage are selected to define a range of acceptable DC breakdown voltages for the gas tube and the clamping voltage of the MOVs at 1 mA is set inside this range.

18. A surge protector for telecommunication equipment comprising:

a gas tube having an impulse breakdown voltage and a DC breakdown voltage, the DC breakdown voltage being in a range between a predetermined minimum and maximum value, and the impulse breakdown voltage being higher than the predetermined maximum DC breakdown voltage; and at least one MOV electrically arranged in parallel with the gas tube, the MOV having at 1 mA a clamping voltage between the predetermined minimum and maximum DC breakdown voltages of the gas tube, wherein the MOV clamps the voltage during a voltage surge to reduce the impulse breakdown voltage of the gas tube without the MOV burning out.

* * * * *